3,047,062
ENHANCING PETROLEUM OIL PRODUCTION
Victor G. Meadors, Tulsa, Okla., assignor to Jersey Production Research Company, a corporation of Delaware
No Drawing. Filed Apr. 29, 1959, Ser. No. 809,590
15 Claims. (Cl. 166—9)

The present invention concerns methods for increasing the production of crude petroleum oils from subterranean oil-bearing strata. More particularly the invention involves a method for the secondary recovery of petroleum oil by a modified waterflooding process. This application is a continuation-in-part of U.S. Serial No. 341,837, filed March 11, 1953, in the name of Victor G. Meadors, entitled "Enhancing Petroleum Oil Production," now abandoned.

It is well known that ordinarily when producing oil from oil-bearing formations only a relatively small fraction of the oil can be obtained unless some artificial means is used to recover any of the large proportion of oil that would normally remain in the reservoir if only the natural forces existing in the reservoir were relied upon for producing this oil. Thus, in order to increase recovery, a variety of methods have been employed. One of these is what is known as waterflooding, wherein water is injected into some of the wells in the producing field to force part of the oil remaining in the oil sands into the adjacent producing wells. Another method is one involving injection of air, or natural gas, or other gaseous hydrocarbons, into some of the wells in the producing field and production of oil from adjacent wells.

It is commonly known that in many instances only about 20% to 25% of the oil in place in the reservoir can be recovered without the use of secondary recovery methods and that normally only an additional 20% to 25% can be produced by the usual waterflooding or gas pressuring methods, leaving some 50% of the oil behind as unrecoverable material. Hence, there is need for secondary recovery methods that will materially increase the ultimate yield of oil from a reservoir.

Among the techniques that have been employed for increasing the efficiency of a secondary recovery process utilizing a waterflood is one in which surface active agents are added to the flood water for the purpose of controlling the interfacial tension between the water and the oil in the reservoir and thus increasing the amount of oil that is displaced by the waterflood. Thus it has been proposed to add such materials as alkyl pyridinium salts, sodium lauryl sulphate, glycosides, sodium oleate, quaternary ammonium compounds, and the like. Although the addition of surface active agents to the water used in a waterflood operation will increase the ultimate recovery of oil, such recovery methods are usually prohibitively expensive because of the tendency of most surface active agents to adsorb out on the surfaces of the rock in the formation being treated. The result of this phenomenon is that the advancing water front is depleted of the surface active material before any great beneficial effect can be realized. Therefore, in many cases, the amount of surface active agent that would be required to provide for effective penetration of the reservoir will entail a cost greatly out of proportion to the value of the additional oil that might have been obtained by virtue of the surface activity.

It is a general object of the present invention to improve on the performance of waterflooding methods for recovering oil from underground operations. It is a more particular object of the invention to overcome the disadvantages heretofore encountered in the use of surface active agents in waterflooding operations while, at the same time, obtaining all of the advantages of such use.

It is a further object of the invention to overcome the limitations heretofore encountered in the use of surface active agents in waterflooding by causing the surface active agent to be formed in situ in the reservoir at the oil-water interface where it will be most useful.

In accordance with this invention, an alkylene oxide is injected into the petroleum reservoir ahead of a waterflood, whereby the alkylene oxide will react with certain minor constituents of the crude oil to form surface active agents at the oil-water interface. Thus, alkylene oxides will react with acids, alcohols, phenols, and amines that are normally present in the crude oil to form surface active reaction products at the oil-water interface where they will tend to remain by virtue of their surface activity.

The alkylene oxides used in this invention have the generic formula

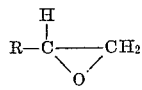

where R may be hydrogen or an alkyl, an aryl, or an aryl alkyl group. Preferably, R should have relatively few carbon atoms since when alkylene oxides of fairly high water solubility are employed reaction products having the desired surface activity will be more readily formed than with alkylene oxides having less water solubility. Specific examples of alkylene oxides that may be used include ethylene oxide, propylene oxide, butylene and isobutylene oxide. Mixed isomers of butylene oxide are also available commercially and are sufficiently water soluble to be useful in this invention. Ethylene and propylene oxides are preferred.

In carrying out the process of this invention, it is preferred that the alkylene oxide be introduced under pressure into the tubing in the injection well. The alkylene oxide may be introduced as a liquid or as a gas, depending on pressure and temperature conditions. The water employed for the waterflood is then subsequently pumped through the same tubing and will force the alkylene oxide into the reservoir ahead of it. There will be a tendency for the alkylene oxide to dissolve in the water behind it, but the material so dissolved will still be capable of undergoing reaction with the reactive components of the crude oil. Thus, alternatively, the alkylene oxide may first be dissolved in water or some other suitable solvent and this solution injected ahead of the waterflood.

As the alkylene oxide is forced into the reservoir by the waterflood behind it, the alkylene oxide will diffuse into the oil-water interface so that an appreciable concentration of alkylene oxide will soon be present in the oil-water interface. Since extremely small amounts of surface active agent will suffice to saturate the oil-water interface, it is not necessary that the reaction between the alkylene oxide and the crude oil constituents proceed to completion or anywhere near to completion.

In general, the amount of alkylene oxide to be injected into the reservoir will be in the range of from about 0.0001 to about 0.1 of the pore volume of the reservoir. Preferably, from about 0.001 to about 0.01 pore volume is used in the case of ethylene oxide. Larger quantities of alkylene oxide than those just mentioned may be used; but it will rarely be economical to use more than 0.50 pore volume. The pore volume is readily calculated from the average porosity of rock samples removed from the formation under consideration, the average thickness of the formation, and the areal extent of the pool being treated.

In some instances, it will be preferable to inject an acid catalyst such as sulfuric acid along with the alkylene oxide but this will not always be necessary. Other mineral acids or strong organic acids such as formic or acetic may be employed as catalysts. The quantity of catalyst may be less than or may equal the quantity of alkylene oxide used.

As alkylene oxides, and particularly ethylene oxide, are sufficiently reactive, at the usual temperatures and pressures encountered in reservoirs, with several types of minor constituents present in crude oils, such as hydroxy compounds, amine compounds, terpenes and other unsaturated compounds, it will not normally be necessary to supply additional heat and pressure to effect the desired reaction. If higher temperatures are desired, however, the alkylene oxide and the subsequent driving water may both be heated before injection into the reservoir.

While available evidence shows that the benefits of this invention are due to the formation of surfactants in situ by the reaction of alkylene oxides with crude oil, other more obscure mechanisms may also be involved. For example, as will be shown later, propylene oxide in laboratory core experiments gives very good recovery of highly refined oils which are presumably not capable of chemical reaction with olefin oxides. Even when such refined oils are used, however, the interfacial tension between the produced oil and water is reduced from about 30 to less than 5 dynes/cm. This reduction in interfacial tension may be in part a consequence of the ampholytic character of the alkylene oxides. However, other solvents which dissolve in both oil and water (such as acetaldehyde) are not as effective in recovering oil as alkylene oxides (such as ethylene oxide or propylene oxide).

The application of the process of this invention to a petroleum reservoir may be illustrated by the following examples:

EXAMPLE 1

A reservoir extending over an area of 1000 acres with an average sand thickness of 20 feet and an average porosity of 20 percent will have a total pore volume of 31 million barrels. The oil contained in such a reservoir may amount to about 17 million barrels after exploitation by conventional primary recovery methods. Of this 17 million barrels, only about four million can be recovered by a conventional waterflood, leaving approximately 13 million barrels of oil not recoverable by conventional primary or secondary methods.

It would be practical on the basis of the relative selling prices of crude oil and of ethylene oxide to invest in as much as 31,000 barrels of ethylene oxide for treating the 1000-acre reservoir since it could be expected that the value of the additional oil recovered would be at least five times that of the ethylene oxide used. The 31,000-barrel quantity is equal to 0.001 of the pore volume of the reservoir.

The preferred procedure for injecting the ethylene oxide is to pump it in as a separate bank, which would be either a liquid or a gas, depending on the temperature and pressure conditions within the reservoir. This bank is followed by a water drive, as already mentioned. As a practical matter, assuming a 10-acre spacing of wells, the 1000-acre reservoir would be penetrated by 100 wells. Utilizing half of these wells as injection wells and half as production wells, approximately 600 barrels of ethylene oxide would be pumped into each well. This could be done at the rate of about 150 barrels per day, thus taking 4 or 5 days, after which time the bank of ethylene oxide is driven through the reservoir by water subsequently pumped into the same wells, and oil recovery would proceed by the mechanism already described, giving an additional yield of eight million barrels of oil.

Although it is preferred to inject a bank of ethylene oxide or other alkylene oxide as described, since the yield of additional oil per unit of invested alkylene oxide will be greatest by this procedure, it requires a large initial investment in alkylene oxide. Therefore, economic conditions may dictate use of a procedure wherein the investment is spread out over a relatively long period. Thus, as an alternative procedure, the alkylene oxide may be dissolved in the water drive. In applying the alternative procedure to the example given, the 31,000 barrels of ethylene oxide could be injected as a bank of 3.1 million barrels (0.1 pore volume) of a one percent solution of ethylene oxide or as a larger bank of a correspondingly lower concentration of ethylene oxide.

EXAMPLE 2

Some laboratory tests were made on linear models of Weiler sandstone containing a Mid-Continent crude of 38° API gravity and connate water. Various amounts of ethylene oxide were used in the several tests. In each case, the ethylene oxide was driven through the model by a following water drive. The results obtained after the injection of two pore volumes of total fluid are as follows:

*Recovery of 38° API Crude From Weiler Sandstone by Banks of Ethylene Oxide*

| Ethylene Oxide Bank Size, Percent PV | Initial Oil Saturation, Percent PV [1] | Oil Recovery, Percent PV | Residual Oil, Percent PV |
|---|---|---|---|
| 0 (reference waterflood) | 74.0 | 42.0 | 32.0 |
| 6 | 71.0 | 47.5 | 23.5 |
| 8 | 71.4 | 49.5 | 21.9 |
| 10 | 70.0 | 50.4 | 19.6 |
| 24.5 | 74.0 | 54.0 | 20.0 |
| 35.8 | 72.0 | 52.3 | 19.7 |

[1] Pore volume—remainder water.

From the above, it is apparent that the ethylene oxide has produced considerable additional oil. It is also apparent that the efficiency of the ethylene oxide is most pronounced at the lower volume levels, a result believed to be due to the interaction of the oxide with the crude oil to form surfactants. As will be developed later, however, the effectiveness of the oxide may be at least partly due to some other mechanism.

EXAMPLE 3

The effectiveness of the use of ethylene oxide in waterflooding as described in the preceding example is in sharp contrast to its effectiveness as one component of a surfactant added directly to a body of flood water. Thus, another set of waterflooding experiments was carried out in a laboratory core in which adducts of ethylene oxide and different phenols were added to the flood water. The oil was another 38° API Mid-Continent crude.

*Recovery of 38° API Crude From Berea Sandstone by Surfactants Consisting of Ethylene Oxide Adducts*

| Surfactant | Concentration, Percent | Initial Oil Satn., Percent PV | Recovery After 2 PV, Percent PV | Oil Satn. After 2 PV, Percent PV |
|---|---|---|---|---|
| None | | 80.1 | 43.0 | 37.1 |
| A [1] | 0.1 | 83.0 | 46.8 | 36.2 |
| B [1] | 0.1 | 74.8 | 34.3 | 40.5 |
| C [2] | 0.2 | 83.9 | 47.3 | 36.6 |

[1] A and B are nonylphenol and varying amounts of ethylene oxide.
[2] C is an adduct of diisobutylphenol with 8–9 mols of ethylene oxide.

Berea sandstone is like the Weiler sand in its general flooding characteristics. It is evident, then, from the foregoing data that the residual oil saturation in the cores remained high when using the surfactant agents, which was not the case when using the oxide of the present invention. It is particularly interesting that, when using surfactant B, the recovery was even less favorable than when using a waterflood alone.

EXAMPLE 4

A test using the same oil and sandstone as in Example 2 was carried out using a solution of butylene oxide driven by water. Results of this test are as follows:

*Recovery of 38° API Crude From Weiler Sandstone by a Bank of Butylene Oxide*

| Butylene Oxide Bank Size, percent PV | Initial Oil Saturation, percent PV | Oil Recovery, percent PV | Residual Oil, percent PV |
|---|---|---|---|
| 0 (reference waterflood) | 76.6 | 38.5 | 38.1 |
| 33.8 | 76.3 | 66.3 | 10.0 |

From the above, it is apparent that the butylene oxide bank driven by water secured an appreciably greater recovery of oil than water alone.

EXAMPLE 5

Tests were also carried out using a 39% aqueous solution of propylene oxide driven by water for the recovery of a highly refined oil having a viscosity of about 1.3 centipoises. The results of these tests are as follows:

*Recovery of Soltrol From Gifford Hill Sand by Banks of Saturated Propylene Oxide Solution*

| Bank Size, percent PV | Initial Oil Satn., percent PV | Residual Oil, percent PV, After Total Fluid Injected of— | | |
|---|---|---|---|---|
| | | 0.75 PV | 1 PV | 1.25 PV |
| 0 | 82.0 | 20.8 | 19.3 | 18.7 |
| 25 | 85.0 | 14.8 | 12.0 | 12.0 |
| 50 | 75.5 | 14.1 | 8.8 | 7.8 |

From the above, it is apparent that appreciably greater quantities of oil were recovered when using propylene oxide solution driven by water than when using water alone.

EXAMPLE 6

Additional tests were conducted using a bank of a saturated solution of propylene oxide followed by a water drive. The results of these tests are as follows:

*Recovery of Primol[1] From Gifford Hill Sand by Water and by a Water-Driven Bank of Saturated Propylene Oxide Solution*

| Total Pore Volumes Injected | Oil Saturation, percent PV | |
|---|---|---|
| | Waterflood | 0.5 PV, Propylene Oxide Solution Followed by Water |
| 0 | 82.7 | 82.2 |
| 0.50 | 46.5 | 35.0 |
| 0.75 | 41.8 | 23.8 |
| 1.0 | 39.2 | 16.2 |
| 1.25 | 36.5 | 13.9 |
| 1.50 | 34.2 | 12.8 |
| 1.75 | 32.6 | 12.5 |
| 2.0 | 31.0 | 12.5 |
| 3.0 | 26.7 | 12.5 |
| 5.0 | 19.2 | |
| 7.0 | 14.6 | |

[1] Primol—a refined oil having a viscosity of about 100 centipoises.

From the above, it appears that the ultimate recovery by the two processes is about the same. However, the use of propylene oxide reduced the injection requirements from about seven pore volumes to 1.75 pore volumes. This marked reduction in injection requirements is a completely unexpected result and one of great importance from the point of economics. The results are similar to those which would be expected by using a driving fluid of high viscosity. However, the viscosity of a saturated aqueous solution of propylene oxide is only 1.43 cp. (as compared to 100 cp. for the displaced oil), so that some other mechanism is involved. Regardless of the mechanism, the fact is that the process of the present invention offers a substantial improvement and saving over the use of water-soluble gums and other water-thickening agents which have been proposed for use in waterflooding operations.

EXAMPLE 7

As a further example of the novel and unusual benefits obtained by using propylene oxide in the manner of the present invention, a comparative test was made, using acetaldehyde to displace a high-viscosity oil from Gifford Hill sand. Some properties of the two reagents are compared in the following table:

| | Acetaldehyde | Propylene Oxide |
|---|---|---|
| Molecular weight | 44 | 58. |
| Density, g./ml. | 0.783 | 0.859. |
| Boiling point, °C | 21 | 35. |
| Solubility in water | Miscible | 65 g./100 ml. |
| Solubility in ether | Miscible | Miscible. |

The results of the flooding tests were as follows:

*Comparison of Recovery of Primol From Gifford Hill Sand by Aqueous Solutions of Acetaldehyde and Propylene Oxide Followed by Water*

| Total Pore Volumes Injected | Oil Saturation, percent PV | | |
|---|---|---|---|
| | Waterflood | 0.5 PV of 40% Propylene Oxide Followed by Water | 0.4 PV of 50% Acetaldehyde Followed by Water |
| 0 | 82.7 | 82.2 | 85.7 |
| 0.5 | 46.5 | 35.0 | 41.6 |
| 0.75 | 41.8 | 23.8 | 34.5 |
| 1.00 | 39.2 | 16.2 | 30.9 |
| 1.25 | 36.5 | 13.9 | 28.5 |
| 1.50 | 34.2 | 12.8 | 27.0 |
| 1.75 | 32.6 | 12.5 | 26.0 |
| 2.00 | 31.0 | 12.5 | 25.2 |

It is evident that, although acetaldehyde and propylene oxide have rather similar solubility characteristics, the propylene oxide gives far better oil recovery than does an equal amount of acetaldehyde.

EXAMPLE 8

Two runs were made. In one run, propylene oxide was passed through an unconsolidated core of Weiler sandstone, and in another run a surfactant comprising the adduct of one mole of $C_{13}$ oxo-alcohol plus 12 moles of ethylene oxide was passed through a core of the same sand. The results secured are as follows:

| Volume Fluid Produced (Pore Volumes) | Effluent Concentration in percent of the Concentration of Injected Solution | |
|---|---|---|
| | Propylene Oxide | Surfactant |
| 1.0 | 75 | 0 |
| 1.5 | 100 | 0 |
| 2.0 | | 0 |
| 3.0 | | 0 |
| 4.0 | | 4 |
| 5.0 | | 50 |
| 6.0 | | 75 |
| 7.0 | | 83 |
| 8.0 | | 88 |
| 8.5 | | 88 |
| 9.0 | | 88 |

It is apparent from the foregoing that substantially no adsorption occurred when employing propylene oxide on the sand; whereas, substantial adsorption of the surfactant occurred. It is thus apparent that substantial differences in behavior occur when using the oxides of the present

What is claimed is:

1. A process for the secondary recovery of petroleum oil from a subterranean oil-bearing reservoir which comprises: injecting into said reservoir at a first selected point a quantity of an alkylene oxide, injecting a quantity of water into said reservoir behind said quantity of alkylene oxide and recovering produced oil from said reservoir at a second selected point removed from said first selected point.

2. Process as defined in claim 1, in which said alkylene oxide is injected into said reservoir as a bank ahead of said quantity of water.

3. Process as defined by claim 1, in which said alkylene oxide is injected into said reservoir as an aqueous solution.

4. Process as defined by claim 1, in which said alkylene oxide comprises ethylene oxide.

5. Process as defined by claim 1, in which said alkylene oxide comprises propylene oxide.

6. Process as defined by claim 1, in which said alkylene oxide comprises a butylene oxide.

7. Process as defined by claim 1, in which said quantity of alkylene oxide constitutes from 0.0001 to 0.1 of the pore volume of the formation lying between said selected points.

8. In the secondary recovery of crude oil from a producing formation wherein water is introduced into said formation at a first selected point and produced oil and water are removed from said formation at a second selected point, the improvement which comprises injecting ahead of the water a quantity of an alkylene oxide.

9. In a waterflooding process for the recovery of petroleum from a subterranean petroleum-bearing reservoir, the improvement which comprises: injecting a bank of alkylene oxide into said reservoir prior to the waterflood, the volume of said bank being at least about 0.0001 pore volume of the extent of the reservoir being treated.

10. A process as defined in claim 9 in which the bank of oxide is no more than 0.50 pore volume in size.

11. In a method of waterflooding an underground oil reservoir by injecting flood water into the reservoir through at least one input well and recovering oil from the reservoir through at least one output well, the improvement which comprises injecting a quantity of an alkylene oxide into the reservoir ahead of the flood water, said bank comprising 0.0001 to 0.5 pore volume of the reservoir.

12. A method as defined in claim 11 in which the alkylene oxide is ethylene oxide.

13. A method as defined in claim 11 in which the alkylene oxide is propylene oxide.

14. A method as defined in claim 11 in which the alkylene oxide is in the form of an aqueous solution.

15. A method as defined in claim 14 in which the aqueous solution is saturated with the alkylene oxide.

References Cited in the file of this patent

UNITED STATES PATENTS

| | | |
|---|---|---|
| 2,226,119 | De Groote et al. | Dec. 24, 1940 |
| 2,233,381 | De Groote et al. | Feb. 25, 1941 |
| 2,288,857 | Subkow | July 7, 1942 |
| 2,341,500 | Detling | Feb. 8, 1944 |
| 2,531,829 | Seymour | Nov. 28, 1950 |
| 2,623,596 | Whorton et al. | Dec. 30, 1952 |
| 2,779,418 | Garst | Jan. 29, 1957 |
| 2,851,105 | Garst | Sept. 9, 1958 |
| 2,954,825 | Bernard et al. | Oct. 4, 1960 |